US011021608B2

(12) United States Patent
Seyfried et al.

(10) Patent No.: US 11,021,608 B2
(45) Date of Patent: Jun. 1, 2021

(54) AQUEOUS POLYORGANOSILOXANE HYBRID RESIN DISPERSION

(71) Applicant: Evonik Operations GmbH, Essen (DE)

(72) Inventors: Mona Seyfried, Essen (DE); Stefan Silber, Krefeld (DE); Berend-Jan de Gans, Muelheim an der Ruhr (DE); Michael Fiedel, Essen (DE); Markus Hallack, Schermbeck (DE)

(73) Assignee: Evonik Operations GmbH, Essen (DE)

( * ) Notice: Subject to any disclaimer, the term of this patent is extended or adjusted under 35 U.S.C. 154(b) by 46 days.

(21) Appl. No.: 16/268,606

(22) Filed: Feb. 6, 2019

(65) Prior Publication Data

US 2019/0241741 A1 Aug. 8, 2019

(30) Foreign Application Priority Data

Feb. 8, 2018 (EP) ..................... 18155668

(51) Int. Cl.
| C08L 83/10 | (2006.01) |
| C09J 183/10 | (2006.01) |
| C09D 183/10 | (2006.01) |
| C08G 77/445 | (2006.01) |
| C08J 3/05 | (2006.01) |

(52) U.S. Cl.
CPC ............ C08L 83/10 (2013.01); C09D 183/10 (2013.01); C09J 183/10 (2013.01); C08G 77/445 (2013.01); C08J 3/05 (2013.01); C08J 2383/10 (2013.01)

(58) Field of Classification Search
CPC ........ C08G 63/695; C09D 183/10; C08J 3/05; C08J 2383/10
See application file for complete search history.

(56) References Cited

U.S. PATENT DOCUMENTS

| 3,154,597 A | 10/1964 | McWhorter |
| 3,170,962 A | 2/1965 | Tyler |
| 4,287,109 A * | 9/1981 | Schlak ................... C08G 63/20 428/447 |
| 4,452,961 A | 6/1984 | Koerner et al. |
| 4,898,772 A | 2/1990 | Priesch et al. |
| 5,401,871 A | 3/1995 | Feldmann-Krane et al. |
| 5,613,988 A | 3/1997 | Spiegler et al. |
| 5,733,971 A | 3/1998 | Feldmann-Krane et al. |
| 5,804,099 A | 9/1998 | Heilen et al. |
| 5,863,966 A | 1/1999 | Ebbrecht et al. |
| 5,977,282 A | 11/1999 | Ebbrecht et al. |
| 5,994,415 A | 11/1999 | Grüning et al. |
| 6,054,534 A | 4/2000 | Josten et al. |
| 6,194,596 B1 | 2/2001 | Josten et al. |
| 6,218,459 B1 | 4/2001 | Gruning et al. |
| 6,235,813 B1 | 5/2001 | Brandt et al. |
| 6,268,521 B1 | 7/2001 | Gruning et al. |
| 6,288,129 B1 | 9/2001 | Gruning et al. |
| 6,297,331 B1 | 10/2001 | Feldmann-Krane et al. |
| 6,310,123 B1 | 10/2001 | Boinowitz et al. |
| 6,353,068 B1 | 3/2002 | Dietz et al. |
| 6,391,831 B1 | 5/2002 | Ebbrecht et al. |
| 6,420,324 B1 | 7/2002 | Ebbrecht et al. |
| 6,423,785 B1 | 7/2002 | Esselborn et al. |
| 6,433,028 B1 | 8/2002 | Ebbrecht et al. |
| 6,451,863 B1 | 9/2002 | Ebbrecht et al. |
| 6,525,103 B2 | 2/2003 | Ebbrecht et al. |
| 6,552,091 B1 | 4/2003 | Boinowitz et al. |
| 6,552,092 B2 | 4/2003 | Ebbrecht et al. |
| 6,686,320 B2 | 2/2004 | Ebbrecht et al. |
| 6,689,731 B2 | 2/2004 | Esselborn et al. |
| 6,734,271 B2 | 5/2004 | Reusmann |
| 6,794,445 B2 | 9/2004 | Reusmann et al. |
| 6,835,420 B1 | 12/2004 | Röckrath et al. |
| 6,858,663 B2 | 2/2005 | Knott et al. |
| 6,861,493 B2 | 3/2005 | Bauer et al. |
| 7,018,458 B2 | 3/2006 | Knott et al. |
| 7,118,619 B2 | 10/2006 | Brandt et al. |
| 7,189,772 B2 | 3/2007 | Bauer et al. |
| RE39,746 E | 7/2007 | Boinowitz et al. |
| 7,393,396 B2 | 7/2008 | Lehmann et al. |
| 7,399,348 B2 | 7/2008 | Blanda et al. |
| 7,442,724 B2 | 10/2008 | Esselborn et al. |
| 8,034,848 B2 | 10/2011 | Landers et al. |
| 8,247,525 B2 | 8/2012 | Schubert et al. |
| 8,268,939 B2 | 9/2012 | Ebbrecht et al. |
| 8,455,603 B2 | 6/2013 | Ferenz et al. |
| 8,557,944 B2 | 10/2013 | Henning et al. |

(Continued)

FOREIGN PATENT DOCUMENTS

| CA | 984075 | 2/1976 |
| CA | 2154818 | 2/1996 |

(Continued)

OTHER PUBLICATIONS

Heilen et al., "*Silicone combination resins/silicone resin hybrids*," Silicone Resins and their Combinations, Chapter 2.2, pp. 29-39, 2015.
Yilgör et al., "*High Strength Silicone-Urethane Copolymers: Synthesis and Properties*," Amer. Chem. Soc. Symposium Series, vol. 729, Chapter 26, pp. 395-407, 2000. DOI:10.1021/bk-2000-0729. ch026.

*Primary Examiner* — Margaret G Moore

(74) *Attorney, Agent, or Firm* — Grüneberg and Myers PLLC

(57) ABSTRACT

An aqueous polyorganosiloxane hybrid resin dispersion can include at least one polyorganosiloxane hybrid resin, at least one amphiphilic emulsifier, and water.

14 Claims, No Drawings

(56) References Cited

U.S. PATENT DOCUMENTS

| | | |
|---|---|---|
| 8,633,291 B2 | 1/2014 | Ebbrecht et al. |
| 8,729,207 B2 | 5/2014 | Hartung et al. |
| 8,772,423 B2 | 7/2014 | de Gans et al. |
| 8,993,706 B2 | 3/2015 | Schubert et al. |
| 9,138,385 B2 | 9/2015 | Dahl et al. |
| 9,266,825 B2 | 2/2016 | Lomoelder et al. |
| 9,346,919 B2 | 5/2016 | Jazkewitsch et al. |
| 9,353,225 B2 | 5/2016 | Knott et al. |
| 9,353,289 B2 | 5/2016 | De Gans et al. |
| 9,441,145 B2 | 9/2016 | Schubert et al. |
| 9,481,695 B2 | 11/2016 | Knott et al. |
| 9,617,390 B2 | 4/2017 | Hinzmann et al. |
| 9,663,622 B2 | 5/2017 | Hinzmann et al. |
| 9,790,327 B2 | 10/2017 | Klotzbach et al. |
| 9,796,876 B2 | 10/2017 | Lomoelder et al. |
| 9,896,541 B2 | 2/2018 | Fiedel et al. |
| 9,902,095 B2 | 2/2018 | Stapperfenne et al. |
| 9,902,096 B2 | 2/2018 | Stapperfenne et al. |
| 10,100,207 B2 | 10/2018 | Stache et al. |
| 10,106,644 B2 | 10/2018 | Fiedel et al. |
| 10,106,649 B2 | 10/2018 | Fiedel et al. |
| 10,239,898 B2 | 3/2019 | Hallack et al. |
| 10,287,454 B2 | 5/2019 | Klotzbach et al. |
| 2002/0011183 A1 | 1/2002 | Esselborn et al. |
| 2002/0019459 A1 | 2/2002 | Albrecht et al. |
| 2002/0132860 A1 | 9/2002 | Ebbrecht et al. |
| 2002/0137804 A1 | 9/2002 | Ebbrecht et al. |
| 2002/0169217 A1 | 11/2002 | Ebbrecht et al. |
| 2003/0166770 A1 | 9/2003 | Bauer et al. |
| 2003/0198819 A1 | 10/2003 | Reusmann et al. |
| 2004/0024089 A1 | 2/2004 | Busch et al. |
| 2004/0060473 A1 | 4/2004 | Bauer et al. |
| 2004/0063818 A1 | 4/2004 | Silber et al. |
| 2004/0152828 A1 | 8/2004 | Brandt et al. |
| 2004/0229768 A1 | 11/2004 | Blanda et al. |
| 2004/0229964 A1 | 11/2004 | Knott et al. |
| 2005/0085563 A1 | 4/2005 | Esselborn et al. |
| 2005/0107523 A1 | 5/2005 | Gippert et al. |
| 2005/0183628 A1 | 8/2005 | Lehmann et al. |
| 2005/0257717 A1 | 11/2005 | Knott et al. |
| 2007/0197678 A1 | 8/2007 | Cavaleiro et al. |
| 2007/0203307 A1 | 8/2007 | Cavaleiro et al. |
| 2007/0213226 A1 | 9/2007 | Sieverding et al. |
| 2008/0019928 A1 | 1/2008 | Franzke et al. |
| 2008/0034794 A1 | 2/2008 | Ebbrecht et al. |
| 2009/0012197 A1 | 1/2009 | Landers et al. |
| 2009/0053552 A1 | 2/2009 | De Gans et al. |
| 2010/0036011 A1 | 2/2010 | De Gans et al. |
| 2010/0184913 A1 | 7/2010 | Ebbrecht et al. |
| 2011/0042004 A1 | 2/2011 | Schubert et al. |
| 2011/0230619 A1 | 9/2011 | Kuppert et al. |
| 2011/0230633 A1 | 9/2011 | Ferenz et al. |
| 2011/0281973 A1 | 11/2011 | Schubert et al. |
| 2012/0010302 A1 | 1/2012 | Hartung et al. |
| 2012/0071564 A1 | 3/2012 | de Gans et al. |
| 2012/0097883 A1 | 4/2012 | Henning et al. |
| 2012/0171147 A1* | 7/2012 | Rautschek ............ C08K 5/521 424/70.12 |
| 2013/0213267 A1 | 8/2013 | Fiedel et al. |
| 2013/0217930 A1 | 8/2013 | Haensel et al. |
| 2014/0131928 A1 | 5/2014 | Ebbrecht et al. |
| 2014/0134125 A1 | 5/2014 | Dahl et al. |
| 2014/0303065 A1 | 10/2014 | Jazkewitsch et al. |
| 2015/0023900 A1 | 1/2015 | Knott et al. |
| 2015/0057412 A1 | 2/2015 | Knott et al. |
| 2015/0073069 A1 | 3/2015 | De Gans et al. |
| 2015/0159068 A1 | 6/2015 | Schubert et al. |
| 2015/0191625 A1 | 7/2015 | Lomoelder et al. |
| 2015/0225337 A1 | 8/2015 | Lomoelder et al. |
| 2015/0321392 A1 | 11/2015 | Stapperfenne et al. |
| 2015/0321393 A1 | 11/2015 | Stapperfenne et al. |
| 2016/0017165 A1 | 1/2016 | Numrich et al. |
| 2016/0108280 A1 | 4/2016 | Hallack et al. |
| 2016/0160081 A1 | 6/2016 | Klotzbach et al. |
| 2016/0208050 A1 | 7/2016 | Klotzbach et al. |
| 2016/0297974 A1 | 10/2016 | Stache et al. |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0152343 A1 | 6/2017 | Günther et al. |
| 2017/0174817 A1 | 6/2017 | Günther et al. |
| 2017/0298250 A1 | 10/2017 | Anselmann et al. |
| 2018/0179234 A1 | 6/2018 | Hallack et al. |
| 2018/0194889 A1 | 7/2018 | Günther et al. |
| 2018/0201795 A1 | 7/2018 | Hed et al. |
| 2019/0048224 A1 | 2/2019 | Stache et al. |
| 2019/0092904 A1 | 3/2019 | Fiedel et al. |

FOREIGN PATENT DOCUMENTS

| | | |
|---|---|---|
| CN | 107573474 | 1/2018 |
| DE | 2 158 348 | 5/1973 |
| DE | 28 35 443 | 2/1980 |
| DE | 34 12 648 | 10/1985 |
| DE | 37 28 414 | 9/1988 |
| DE | 44 15 322 | 11/1995 |
| DE | 10 2013 218 981 | 3/2015 |
| DE | 10 2013 218 976 | 4/2015 |
| EP | 0 008 090 | 9/1983 |
| EP | 0 098 940 | 1/1984 |
| EP | 0 157 318 | 10/1985 |
| EP | 0 092 701 | 1/1987 |
| EP | 0 695 794 | 2/1996 |
| EP | 0 931 806 | 7/1999 |
| EP | 0 940 458 | 9/1999 |
| EP | 1 072 660 | 10/2003 |
| EP | 1 375 568 | 1/2004 |
| EP | 1 533 333 | 5/2005 |
| EP | 2 198 932 | 6/2010 |
| WO | 01/12736 | 2/2001 |
| WO | 2010/046181 | 4/2010 |
| WO | 2014/135353 | 9/2014 |
| WO | 2016/020137 | 2/2016 |
| WO | 2016/020140 | 2/2016 |
| WO | 2016/020200 | 2/2016 |
| WO | 2016/020201 | 2/2016 |
| WO | 2017/009283 | 1/2017 |

\* cited by examiner

AQUEOUS POLYORGANOSILOXANE HYBRID RESIN DISPERSION

CROSS-REFERENCE TO RELATED APPLICATIONS

The present application claims priority to European patent application EP 18155668.9 filed Feb. 8, 2018, the content of which is incorporated by reference in its entirety.

BACKGROUND OF THE INVENTION

Field of the Invention

The present invention relates to aqueous polyorganosiloxane hybrid resin dispersions, to preparation processes therefor and to the use thereof.

Pure silicone resins, called polyorganosiloxanes, are known for their thermal stability and weathering stability. They are used for impregnation on concrete, in coatings of high thermal stability, or in weather-resistant exterior coatings. In order to increase the stability of polyorganosiloxanes, they are modified with other polymers. The mutual chemical linkage of the silicone resins with these polymers takes place in an early phase of the preparation process.

Known organic-modified polyorganosiloxane resins, called polyorganosiloxane hybrid resins hereinafter, are silicone-alkyd resins, silicone-polyester resins, silicone-epoxide hybrid resins, silicone-polyurethane resins and silicone-polyacrylate resins.

It is thus possible to combine the positive properties of pure silicone resins, such as thermal stability, weathering stability and low surface tension, with the positive properties of polyesters, for example, such as low thermoplasticity, high elasticity and good pigment wetting.

The properties of silicone-polyester resins have been found to be particularly advantageous in the decorative coating of thermally durable domestic appliances such as toasters, sunlamp housings, fan heaters and stoves, and the outside coating of deep fat fryers, pots and pans. Coatings of domestic articles additionally have to be detergent-resistant. This means that they have to withstand cleaning in a machine dishwasher, which is customary nowadays, in the presence of surfactant-containing and highly alkaline cleaning compositions without damage. The detergent resistance of a coating is generally determined by the lacquer formulation, but especially by the resin used.

The properties of the epoxy resins can also be combined with the properties of the silicone resins. These silicone-epoxy hybrid resins, by comparison with pure silicone resins, are notable for better metal adhesion and corrosion protection, and better stability to chemicals. A typical application is exhaust pipe coatings, but also paint systems for ceramic substrates such as any kind of stoneware, or concrete. Coating systems of this kind are also used in the shipping sector, for instance for coating of ship's hulls, marine installations below and above the sea surface, and harbour facilities.

Typically, polyorganosiloxane hybrid resins are provided in an organic solvent, for example aromatic hydrocarbons, esters, ethers or ketones, for example xylem, toluene, Solvesso and methoxypropyl acetate, ethyl acetate and butyl acetate. The advantage of solventborne formulations lies in the ease of applicability, good levelling properties and the formation of an initial film on the substrate. The polyorganosiloxane hybrid resin films can be physically dried, reactively cured as a 2-component system or baked. Systems that cure at room temperature are also known.

However, solventborne systems have toxicological and ecological disadvantages. The high content of combustible solvents that are hazardous to health is unfavourable for reasons of health and safety and environmental protection. In addition, the use of solvents is increasingly subject to legal regulations.

There is therefore a constant search for low-solvent or entirely solvent-free systems. The prior art describes numerous proposed solutions for pure silicone resins, called polyorganosiloxanes.

EP 0 098 940 describes a process in which a liquid oligomeric siloxane is emulsified with polyvinyl alcohol or a cellulose ether, in which case the condensation of the liquid oligoorganosiloxane in this emulsion gives a high-viscosity or solid polyorganosiloxane. The disadvantages of this process lie in additional technological complexity since the synthesis of the liquid oligomeric siloxane requires a different methodology than the synthesis of the polymeric organosiloxanes and the condensation in the emulsion is controllable only with difficulty.

DE 21 58 348 describes a process for preparing emulsions based on high-viscosity siloxanes crosslinkable to rubbers, in which a highly dilute preliminary emulsion containing at least 150% water and at least 80% emulsifier, based on the siloxane, is prepared and this emulsion is concentrated by distilling off a solvent/water mixture. This process requires a comparatively high amount of emulsifier, which is undesirable in many applications owing to the significant change in the performance profile and also increases the costs. The maximum siloxane content is 45%, and 5% to 7% solvent remains in the emulsion.

DE 44 15 322 A1 describes a process for preparing aqueous silicone resin emulsions using a polymeric organosilicon compound dissolved in an organic solvent, for example toluene, wherein, after addition of an emulsifier mixture consisting of an ethoxylated triglyceride and an ethoxylated tridecyl alcohol and water to the polymeric organosilicon compound and attainment of a homogeneous mixture which is no longer free-flowing, the organic solvent is removed as a solvent/water mixture before, subsequently, the amount of water required for the attainment of the desired final concentration and optionally known additives are incorporated homogeneously.

There is no indication in this document that this process is suitable for other resins, for example polyorganosiloxane hybrid resins, than the polyorganosiloxanes described.

SUMMARY OF THE INVENTION

It is therefore an object of the present invention to provide an aqueous polyorganosiloxane hybrid resin dispersion usable in various coatings without significant impairment of the other coating properties and the utility value for the respective application.

The object is surprisingly achieved by an aqueous polyorganosiloxane hybrid resin dispersion comprising at least one polyorganosiloxane hybrid resin, at least one amphiphilic emulsifier and water.

DETAILED DESCRIPTION OF THE INVENTION

In principle, the person skilled in the art classifies aqueous polymer dispersions as secondary and primary dispersions. Secondary dispersions form from polymers that are prepared conventionally and then converted to an aqueous dispersion from solution or melt in a subsequent step. By contrast, primary dispersions are those in which the polymer is obtained directly in disperse distribution in the aqueous dispersion medium in the presence of an emulsifier. What is common to all preparation processes is essentially that monomers are used in part to construct the polymer or that this construction is effected exclusively from such monomers.

EP 0 008 090 A1 describes a process for preparing a water-miscible silicone-polyester resin in which the stable dispersion is based on the use of an "acidified" polyester during the preparation of the silicone-polyester resin. As well as the very complex process, there is additionally the risk of redissociation of the polyester (acidic ester hydrolysis) as a result of the acid numbers of 25-110 that are required in this process.

The demands for a reduction in solvent emissions can be taken into account by the aqueous polyorganosiloxane hybrid resin dispersion according to the invention.

Preferably, the polyorganosiloxane hybrid resin is an organic polymer-modified polyorganosiloxane.

More preferably, the polyorganosiloxane hybrid resin comprises reaction products of a composition comprising component A) 5 to 95 parts by weight, preferably 10 to 70 parts be weight, of one or more polyorganosiloxanes of the general formula

$$R_a Si(OR')_b O_{(4-a-b/2)} \quad \text{Formula (I)}$$

with 0<a<2, 0<b<2 and a+b<4, optionally component B) 0-20 parts by weight, preferably 1-10 parts by weight, of one or more linear and/or branched polyorganosiloxanes of the formula

$$R''O\text{—}[R'''_2Si\text{—}O]_n\text{—}R'' \quad \text{Formula (II)}$$

component C) 5 to 95 parts by weight, preferably 30 to 90 parts by weight, of an organic polymer, where $R_a$, R', R" and R''' are each independently an alkyl radical having 1 to 8 carbon atoms or an aromatic radical having 6 to 20 carbon atoms and n is a number in the range from 4 to 250.

The polyorganosiloxane hybrid resins can be prepared in a known manner. Standard processes can be found in DE 10 2013 218976 A1, DE 10 2013 218981A1, U.S. Pat. Nos. 3,154,597 or 3,170,962. The person skilled in the art is aware of further literature, for example "Silicone resins and their combination" by Wernfried Heilen, chapter 2.2 Silicone combination resins/silicone resin hybrids, 2015 or "High Silicones and Silicone-Modified Materials strength Silicone-Urethane Copolymers: Synthesis and Properties, Chapter 26, pp 395-407".

In this case, for example, either a polyorganosiloxane is reacted with an organic polymer containing hydroxyl groups or the organic polymer is prepared in the presence of the polyorganosiloxane by means of suitable monomers, or an organic polymer with alkoxysilane functionality by hydrolysis/condensation or equilibration with alkoxysilane monomers or siloxane oligomers.

Preferably, the polyorganosiloxane is a linear or singly or multiply branched Si—OH— or SiOR$^3$— functional polyorganosiloxane.

Polyorganosiloxanes are also referred to in the literature as siloxane oligomers, alkoxy-functional methyl-, phenyl- and methyl/phenylsiloxanes, hydroxy-functional methyl-, phenyl- and methyl/phenylsiloxanes or silanols.

Alkoxy-functional methyl-, phenyl- or else methyl/phenylsiloxane oligomers are obtainable from ShinEtsu, with the trade names KC-895, KR-500, X 40-9225, X 40-9246, X 40-9250, KR-401N, X-40-9227, KR-510, KR-9218, KR-213.

Methoxy-functional methyl-, phenyl- and methyl/phenylsiloxanes are obtainable from Dow Corning under the trade names Dow Corning® US-CF 2403 Resin, US-CF 2405 Resin, 3037 Intermediate, 3074 Intermediate, RSN-5314 Intermediate. Silanol-functional methyl/phenyl resins are marketed under the trade names RSN-0409 HS Resin, RSN-0431 HS Resin, RSN-0804 Resin, RSN-0805 Resin, RSN-0806 Resin, RSN-0808 Resin, RSN-0840 Resin.

Alkoxy-functional methyl/phenyl-, phenyl- and methylsilicone resins, which are also supplied in hydrolysed form to the corresponding silanol, are commercially available under the SILRES® trade name from Wacker Chemie, for instance with the additional designation REN 50, REN 60, REN 80, KX, HK 46, MSE 100 or SY 300, IC 836, REN 168, SY 409, IC 232, SY 231, IC 368, IC 678.

The preparation of silicone resins of these kinds has long been known in the literature (in this regard see W. Noll—Chemie and Technologic der Silicone [Chemistry and Technology of the Silicones], Wiley-VCH Verlag GmbH & Co. KGaA, Weinheim, 1960), and is also described in German patent specification DE 34 12 648.

The organic polymer preferably comprises polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketone-formaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

The different fragments of the siloxane chains indicated in the formula (I) or formula (II) may be statistically distributed. Statistical distributions may have a blockwise construction with any number of blocks and any sequence or be subject to a randomized distribution, they may also have an alternating construction or else form a gradient along the chain, in particular they can also form any hybrid thereof.

The indices recited herein and the value ranges for the indicated indices can be understood as meaning average values for the possible statistical distribution of the actual existing structures and/or mixtures thereof. This also applies to structural formulae reproduced per se exactly as such, for example formula (I).

The word fragment "poly" encompasses in the context of this invention not just compounds having at least 3 repeating units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

Unless stated otherwise, percentages are figures in percent by weight.

If measured values are reported hereinbelow, these measurements, unless stated otherwise, have been conducted under standard conditions (25° C. and 1013 mbar).

Where averages are reported hereinafter, the values in question are weight averages, unless stated otherwise.

Preferably, the organic polymer is selected from the group of the polyepoxides, polyesters, polyacrylates and methacrylates, polyurethanes, cellulose derivatives, polysulfones, polyether sulfones, polyphenylene sulfides and oxides, polyamides, polyamide imides, polyimides, polyethers, aromatic and aliphatic glycidyl-functional polymers and oligomers, phenoxy resins, polycarbonates, ketone-formaldehyde resins, poly vinyl resins selected from polyvinyl alcohols, polyvinylacetates and derivatives thereof, phenolic resins, fluoropolymers, alkyd resins, coumarone/indene resins and mixtures thereof.

More preferably, the organic polymer contains hydroxyl groups and/or acidic hydrogens.

It has been found that, surprisingly, polymeric amphiphilic emulsifiers are of particularly good suitability for stabilization of an aqueous polyorganosiloxane hybrid resin dispersion and do not have any adverse effect on the coating.

Preferably, the emulsifiers are non-ionic block copolymers having one or more hydrophobic units and having one or more hydrophilic units, where the hydrophobic unit preferably consists of polypropylene oxide, organically modified polypropylene oxide or polybutylene oxide, and the hydrophilic unit consists of polyethylene oxide.

For the polyorganosiloxane hybrid resin dispersion according to the invention, preference is given to an emulsifier selected from
- triblock copolymers having a middle block of polypropylene oxide and two terminal blocks of polyethylene oxide of the general formula (a) $HO(C_2H_4O)_x(C_3H_6O)_y(C_2H_4O)_xH$,
- triblock copolymers having a middle block of polybutylene oxide and two terminal blocks of polyethylene oxide of the general formula (b) $HO(C_2H_4O)_x(C_4H_8O)_y(C_2H_4O)_xH$,
- triblock copolymers having a middle block of polyethylene oxide and two terminal blocks of polypropylene oxide of the general formula (c) $HO(C_3H_6O)_x(C_2H_4O)_y(C_3H_6O)_xH$,
- diblock copolymers having a block of polypropylene oxide and a block of polyethylene oxide of the general formula (d1) $RO(C_3H_6O)_y(C_2H_4O)_xH$ or of the general formula (d2) $RO(C_2H_4O)_x(C_3H_6O)_yH$, with R being an organic radical of the general formula $C_mH_{2m+1}$ with $1 \leq m \leq 22$, and
- multiblock copolymers having four middle blocks of polypropylene oxide and four terminal blocks of polyethylene oxide of the general formula (e) $[HO(C_2H_4O)_x(C_3H_6O)]_2NC_2H_4N[C_3H_6O)_y(C_2H_4O)_x]_2H$, or mixtures thereof.

x and y are integers and represent the number of the respective monomer units. The general formulae (a) to (e) serve for illustration.

Emulsifiers of this kind are obtainable, for example, under the Pluronic, Kolliphor or Lutrol name (from BASF), Genapol PF (from Clariant), Imbentin-PAP (from Kolb), Synperonic PE (from Croda), ADEKA NOL (from Adeka), Emulgen PP (from Kao), Teric PE, Empilan P or Surfonic POA-L (from Huntsman), Newpol PE (from Sanyo), also known under the poloxamers name, Vorasurf 504 (from DOW), Pluronic RPE (from BASF), Surfonic POA (from Huntsman), Tergitol X (from DOW) Genapol ED (from Clariant) and Synperonic T (from Croda).

More preferably, the polymeric amphiphilic emulsifiers are triblock copolymers having a middle block of polypropylene oxide and two terminal blocks of polyethylene oxide according to the illustration in the general formula (a) or mixtures thereof.

Preferably, the emulsifiers according to the invention or mixtures thereof have an HLB value of 9 to 19, more preferably an HLB value of 11 to 17.

The HLB (hydrophilic-lipophilic balance) value is determined according to formula (III):

$$HLB = 20 \times \frac{M_{hydro}}{M_{tot}} \qquad \text{Formula (III)}$$

with $M_{hydro}$=mass of the monomers used for the hydrophilic blocks in the preparation of the triblock copolymers and $M_{tot}$=total mass of monomers.

The HLB value can also be calculated for mixtures of triblock copolymers of formula (IV):

$$HLB = \frac{1}{M}\sum_{i=1}^{N} M_i HLB_i \qquad \text{Formula (IV)}$$

where
M=mass of the respective triblock copolymer,
M=total mass of triblock copolymers and
$HLB_i$=HLB value of the respective triblock copolymer.

The amphiphilic polymeric emulsifiers generally have a more or less broad molecular weight distribution. Preferably, the emulsifiers according to the invention or mixtures thereof have an average molecular weight Mw>1000 g/mol and more preferably Mw>1700 g/mol.

Preferably, the emulsifier or emulsifier system in aqueous solution has a conductivity, measured according to DIN 53779, of 10-25 000 $\mu S \cdot cm^{-1}$, preferably 50-5000 $\mu S \cdot cm^{-1}$ and more preferably 200-2500 $\mu S \cdot cm^{-1}$.

It is also conceivable to use the emulsifiers according to the invention together with other emulsifiers, for example with anionic, cationic or nonionogenic emulsifiers.

In the context of this application, mixtures of triblock copolymers are understood to mean emulsifier systems, where further different emulsifiers may be added. Emulsifiers and emulsifier systems are used as synonyms.

Preferably, the residual solvent content is <5.0% by weight, preferably <2.5% by weight, more preferably <1.0% by weight, based on the polyorganosiloxane hybrid resin dispersion.

If desired, the polyorganosiloxane hybrid resin dispersion preferably includes further additives selected from defoamers, deaerating agents, rheology additives, preservatives, substrate wetting agents, crosslinkers, drying aids, catalysts, antioxidants, anti-skinning agents, anti-settling agents, thickeners, coalescing agents, film-forming aids, fillers, pigments and/or dispersants.

Preferably, the pigments are organic or inorganic pigments or carbon black pigments. Examples of inorganic pigments include iron oxides, chromium oxides or titanium oxides. Suitable organic pigments are, for example, azo pigments, metal complex pigments, anthraquinoid pigments, phthalocyanine pigments, and polycyclic pigments, especially those of the thioindigo, quinacridone, dioxazine, pyrrolopyrrole, naphthalenetetracarboxylic acid, perylene, isoamidolin(on)e, flavanthrone, pyranthrone or isoviolanthrone series. Carbon blacks used may be gas blacks, lamp blacks or furnace blacks. These carbon blacks may additionally be post-oxidized and/or converted to beads.

It is optionally possible to add further additives. An additive in this context is any component that has a positive effect on the properties of the dispersion according to the invention. It is possible to add one or more additives independently of one another. Listed hereinafter are some additives that can be used for the dispersion according to the invention. The enumeration is non-conclusive. Additives usable advantageously are especially wetting and dispersing additives. A multitude of wetting and dispersing additives which can be used for the dispersions according to the invention is available on the market. As a suitable chemical basis, mention may be made, for example, of styrene-maleic anhydride copolymers, acrylates, polyethers, e.g. styrene oxide polyethers, polyesters, amino polyesters, polyurethanes and amino polyethers. The additives may have different topologies, for example linear, branched, comb-like or star-shaped. Typically, wetting and dispersing additives have a heterogeneous structure divided into a bonding group and a stabilizing side-chain.

As well as pigments, it is also possible to use fillers in the dispersions according to the invention. Suitable fillers are, for example, those based on kaolin, talc, mica, other silicates, quartz, cristobalite, wollastonite, perlite, diatomaceous earth, fibrous fillers, aluminium hydroxide, barium sulfate, glass or calcium carbonate.

The use of a defoamer or deaerating agent may be advantageous in order to actively reduce the amount of air introduced in processing or production operations. Examples include those based on mineral oil or vegetable oil or based on polyether siloxanes, in some cases filled with particulate components, for example silica.

Examples of further additives may include binders, dyes, surface additives, compatibilizers, UV stabilizers and preservatives.

Preferably, the preservatives used are fungicides, bactericides, pesticides, algicides and/or herbicides.

Preferably, the average volume-weighted diameter of the polyorganosiloxane hybrid resin particles is between 0.1-10.0 μm, preferably between 0.1-2.0 μm, more preferably between 0.2-1.0 μm and especially preferably between 0.2-0.7 μm, measured according to ISO 13320:2009. For the present invention, the average volume-weighted diameter of the particles was determined with the aid of a Coulter LS 13320 instrument from Beckman Coulter.

Preferably, the polyorganosiloxane hybrid resin dispersion has a solids content of 30.0% by weight-70.0% by weight, preferably 45.0% by weight-55.0% by weight, based on the dispersion.

The invention further provides a process for producing aqueous polyorganosiloxane hybrid resin dispersion, comprising the steps of
  emulsifying a polyorganosiloxane hybrid resin solution comprising an organic solvent with at least one emulsifier or an emulsifier system,
  adding water,
  removing the solvent.

Preference is given to using an aqueous emulsifier solution or aqueous emulsifier system solution having a conductivity, measured according to DIN 53779, of 10-25 000 $\mu S \cdot cm^{-1}$, preferably 50-5000 $\mu S \cdot cm^{-1}$ and more preferably 200-2500 $\mu S \cdot cm^{-1}$.

It has been observed that the conductivity also contributes to the stability of the emulsified polyorganosiloxane hybrid resin solution comprising an organic solvent in water with at least one emulsifier or an emulsifier system.

Advantageously, it is possible to adjust the conductivity of the aqueous emulsifier solution or the aqueous emulsifier system solution.

Water-soluble salts are suitable for adjustment of the conductivity. Preference is given here to using salts containing fluoride, chloride, sulfate, hydrogensulfate, thiosulfate, sulfite, phosphate, hydrogenphosphate, dihydrogenphosphate, carbonate, hydrogencarbonate, hydroxide, nitrate, acetate, lactate, formate, propionate, citrate, fumarate, malate, malonate, oxalate, pyruvate, benzoate or tartrate as anion or mixtures thereof. Particular preference is given to acetate, dihydrogenphosphate, hydrogenphosphate or hydroxide as anion, and very particular preference to the ammonium, potassium and sodium salts thereof.

The conductivity is preferably determined with the aid of a spectrometer. An example of a spectrometer available on the market is the DT 1200 instrument from Dispersion Technology. Preferably, the emulsifiers are block copolymers having one or more hydrophobic units and having one or more hydrophilic units, where the hydrophobic unit preferably consists of polypropylene oxide, organically modified polypropylene oxide or polybutylene oxide, and the hydrophilic unit consists of polyethylene oxide.

For the process according to the invention, preference is given to an emulsifier selected from
  triblock copolymers having a middle block of polypropylene oxide and two terminal blocks of polyethylene oxide of the general formula (a) $HO(C_2H_4O)_x(C_3H_6O)_y(C_2H_4O)_xH$,
  triblock copolymers having a middle block of polybutylene oxide and two terminal blocks of polyethylene oxide of the general formula (b) $HO(C_2H_4O)_x(C_4H_8O)_y(C_2H_4O)_xH$,
  triblock copolymers having a middle block of polyethylene oxide and two terminal blocks of polypropylene oxide of the general formula (c) $HO(C_3H_6O)_x(C_2H_4O)_y(C_3H_6O)_xH$,
  diblock copolymers having a block of polypropylene oxide and a block of polyethylene oxide of the general formula (d1) $RO(C_3H_6O)_y(C_2H_4O)_xH$ or of the general formula (d2) $RO(C_2H_4O)_x(C_3H_6O)_yH$, with R being an organic radical of the general formula $C_mH_{2m+1}$ with $1 \leq m \leq 22$, and
  multiblock copolymers having four middle blocks of polypropylene oxide and four terminal blocks of polyethylene oxide of the general formula (e) $[HO(C_2H_4O)_x(C_3H_6O)_y]_2NC_2H_4N[(C_3H_6O)_y(C_2H_4O)_x]_2H$,
  or mixtures thereof.

x and y are integers and represent the number of the respective monomer units. The general formulae (a) to (e) serve for illustration.

Emulsifiers of this kind are obtainable, for example, under the Pluronic, Kolliphor or Lutrol name (from BASF), Genapol PF (from Clariant), Imbentin-PAP (from Kolb), Synperonic PE (from Croda), ADEKA NOL (from Adeka), Emulgen PP (from Kao), Teric PE, Empilan P or Surfonic POA-L (from Huntsman), Newpol PE (from Sanyo), also known under the poloxamers name, Vorasurf 504 (from DOW), Pluronic RPE (from BASF), Surfonic POA (from Huntsman), Tergitol X (from DOW) Genapol ED (from Clariant) and Synperonic T (from Croda).

More preferably, the polymeric amphiphilic emulsifiers are triblock copolymers having a middle block of polypropylene oxide and two terminal blocks of polyethylene oxide according to the general formula (a) for illustration or mixtures thereof.

Preferably, the emulsifiers or mixtures thereof have an HLB value of 9 to 19, more preferably an HLB value of 11 to 17.

The HLB (hydrophilic-lipophilic balance) value is determined according to formula (III):

$$HLB = 20 \times \frac{M_{hydro}}{M_{tot}} \quad \text{Formula (III)}$$

with $M_{hydro}$=mass of the monomers used for the hydrophilic blocks in preparation of the triblock copolymers and $M_{tot}$=total mass of monomers.

The HLB value can also be calculated for mixtures of triblock copolymers of formula (IV):

$$HLB = \frac{1}{M}\sum_{i=1}^{N} M_i HLB_i \quad \text{Formula (IV)}$$

where
$M_i$=mass of the respective triblock copolymer,
M=total mass of triblock copolymers and
$HLB_i$=HLB value of the respective triblock copolymer.

The amphiphilic polymeric emulsifiers generally have a more or less broad molecular weight distribution. Preferably, the emulsifiers according to the invention or mixtures thereof have an average molecular weight Mw>1000 g/mol and more preferably Mw>1700 g/mol.

Preferably, the polyorganosiloxane hybrid resin used comprises reaction products of a composition comprising
component A) 5 to 95 parts by weight, preferably 10 to 70 parts by weight, of one or more polyorganosiloxanes of the general formula $$R_a Si(OR')_b O_{(4-a-b/2)} \quad \text{Formula (I)}$$

with 0<a<2, 0<b<2 and a+b<4,
optionally component B) 0-20 parts by weight, preferably 1-10 parts by weight, of one or more linear and/or branched polyorganosiloxanes of the formula $$R''O-[R'''_2Si-O]_n-R'' \quad \text{Formula (II)}$$

component C) 5 to 95 parts by weight, preferably 30 to 90 parts by weight, of an organic polymer,
where
$R_a$, R', R" and R'" are each independently an alkyl radical having 1 to 8 carbon atoms or an aromatic radical having 6 to 20 carbon atoms and n is a number in the range from 4 to 250.

Preferably, the polyorganosiloxane is a linear or singly or multiply branched Si—OH— or $SiOR^3$— functional polyorganosiloxane. Polyorganosiloxanes available on the market have been described above.

The organic polymer preferably comprises polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketone-formaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

More preferably, the organic polymer comprises organic polymers containing hydroxyl groups, preferably selected from the group of the polyepoxides, polyesters, polyacrylates, polymethacrylates, polyurethanes and cellulose derivatives.

Preferably, the emulsifier system comprises block copolymers having one or more hydrophobic blocks and having one or more hydrophilic blocks, where the hydrophobic block preferably consists of polypropylene oxide, organically modified polypropylene oxide or polybutylene oxide, and the hydrophilic block consists of polyethylene oxide.

Preferably, the solvent is an organic solvent or a mixture of organic solvents that has been used in the preparation of the polyorganosiloxane hybrid resin. Preference is given to using an organic solvent from the group of the ketones selected from methyl ethyl ketone, acetone, methyl isobutyl ketone, diethyl ketone, methyl propyl ketone or cyclohexanone, methylcyclohexanone, esters selected from ethyl acetate, butyl acetate, ethyl propionate or isobutyl acetate, tert-butyl acetate, carbonates, for example dialkyl carbonates or cyclic carbonates such as ethylene carbonate, propylene carbonate or glycerol carbonate, aromatic hydrocarbons, for example xylene, cyclic hydrocarbons, for example cyclohexane, ethers, for example dibutyl ether, ester ethers, for example methoxypropyl acetate. It is conceivable to use other solvents known to those skilled in the art or mixtures of different solvents.

More preferably, the organic solvent or mixture thereof has a boiling point range of 50° C.-150° C., preferably 90° C.-120° C.

Preferably, the solvent is removed by means of distillation under reduced pressure with or without stripping gas, steam distillation, or by means of a membrane process or a thin-film evaporator.

Preferably, the polyorganosiloxane hybrid resin dispersion has a polyorganosiloxane hybrid resin concentration of 40.0% by weight-95.0% by weight, preferably 60.0% by weight-70.0% by weight, based on the polyorganosiloxane hybrid resin solution.

Preferably, the mass ratio of the polyorganosiloxane hybrid resin solution to the aqueous emulsifier solution or emulsifier system solution is >2:1, preferably 3:1 to 10:1, more preferably 4:1 to 8:1.

The utilization of the inventive polyorganosiloxane hybrid resin dispersion in coating materials as well as coatings and paints, substrate coatings, adhesives, structural adhesive, compounding matrices and sizes is also subject of this invention. Further fields of use are in the production of printing inks or 3D printing materials.

Substrates according to the invention, especially baking trays, baking tins, pans, metal pots and the like, coated with a composition comprising a polyorganosiloxane hybrid resin dispersion according to the invention are likewise encompassed. Substrates are preferably ceramic, polymeric or metallic substrates.

The subject-matter of the invention will be described by way of example below, without any intention that the invention be restricted to these illustrative embodiments.
Methods:
Measurement of Conductivity The conductivity of the aqueous emulsifier solutions was determined according to DIN 53779. A DT1200 measuring instrument from Dispersion Technology was used. The conductivity value is the average from a triple determination.
Measurement of Particle Size The particle size of the dispersions is determined according to ISO 13320:2009. An LS13320 instrument from Beckman-Coulter was used. The particle size was calculated assuming a refractive index $n_d$=1.51. The calculated average particle diameter is volume-weighted.

Determination of Solids Content:

The content of nonvolatile components is determined according to DIN EN ISO 3251:2008; in the context of the present invention, for the determination of the solids content, the testing of the polyorganosiloxanes and of the polyorganosiloxane hybrid resin solutions was conducted at 180° C. for 60 minutes, and for the dispersions at 105° C. for 60 minutes.

Viscosity Determination

Viscosities were determined by means of a Brookfield LV-DV-I+ spindle viscometer. Brookfield viscometers are rotary viscometers with defined spindle sets as rotary bodies. The rotary bodies used were from an LV spindle set. Owing to the temperature dependence of viscosity, the temperatures of the viscometer and of the measuring liquid were kept constant during the measurement, with an accuracy of +/−0.5° C. Further materials used in addition to the LV spindle set were a thermostatable water bath, a 0-100° C. thermometer (scale divisions 1° C. or smaller) and a timer (scale values not greater than 0.1 second). For the measurement, 100 ml of the sample were charged to a wide-necked flask; the measurement was made under temperature-controlled conditions and in the absence of air bubbles, after prior calibration. The viscosity determination was carried out by positioning the viscometer in relation to the sample in such a way that the spindle was immersed in the product up to the mark. The measurement is initiated by activation of the start button, while care was taken to ensure that the measurement took place in the most favourable measurement region of 50% (+/−20%) of the maximum measurable torque. The result of the measurement was displayed by the viscometer in mPas, while division by the density (g/ml) gives the viscosity in $mm^2/s$.

Residual Solvent Content

The determination of the residual solvent content was conducted in accordance with European Pharmacopoeia 5.4 Residual solvents.

König Pendulum Hardness

For the König determination of pendulum hardness (DIN 53157 or EN ISO 1522), the measure used is the damping of a swinging pendulum. The pendulum with two stainless steel balls is placed onto a coating film. There is a physical relationship between the duration of pendulum swinging, amplitude, and the geometric dimensions of the pendulum. The viscoelastic behaviour of the coating is the decisive factor for the hardness. When the pendulum is set in swinging motion, the balls roll on the surface and thereby exert pressure on it. The greater or lesser recovery is dependent on the elasticity. The absence of elastic forces causes severe damping of the pendulum movement. High elastic forces, in contrast, cause only little damping.

"König" pendulum hardness:
Number of swings in osc.
1 oscillation=1.4 seconds

Further Conditions

Where % figures are given in the context of the present invention, the figures in question are in weight % unless stated otherwise. In the case of compositions, the % figures are based on the entire composition unless stated otherwise. Where averages are reported in the examples which follow, these are number averages unless stated otherwise. Where measurement values are reported hereinafter, these measurement values, unless stated otherwise, have been determined under a pressure of 101 325 Pa, at a temperature of 23° C. and the ambient relative atmospheric humidity of about 40%.

Materials and Equipment:
Glass plates, from Gläserei Glänzer, dimensions: 90×150×5 mm
PVC sheets, Mat. No: 4364002858, from KVG Kunststoff Betriebs GmbH
300 μm bar applicator, from Simex
300 μm cube applicator, from TQC GmbH
Dispermat, from VMA Getzmann with Teflon disc
Wide-neck glass bottles
Pluronic® F 127/Poloxamer 407, from BASF
Synperonic® PE F 108/Poloxamer 338, from Croda
Tergitol® 15-S-15, from DOW Chemical
Tergitol® 15-S-7, from DOW Chemical
Tergitol® 15-S-5, from Dow Chemical
Tagat® R200, from Evonik Industries
TEGO® Alkanol TD12, from Evonik Industries
TEGO® Alkanol TD6, from Evonik Industries
Silikopon® EW, from Evonik Industries

EXAMPLES

Preparation of Aqueous Polyorganosiloxane Hybrid Dispersions According to the Invention For the preparation of the aqueous polyorganosiloxane hybrid dispersion according to the invention, a solvent-based polyorganosiloxane hybrid solution is first prepared. The solvent is then removed by the process according to the invention.

1. Preparation of a solvent-based polyorganosiloxane hybrid solution with polyester (called silicone-polyester hybrid solution for simplification hereinafter)

1.1 Preparation of a polyorganosiloxane as component A
      Solvents used: methyl isobutyl ketone (MIBK), diethyl carbonate (DEC), methyl propyl ketone (MPK), ethyl acetate (EtAc), isobutyl acetate (iBuAc), ethyl isobutyrate (EtiBu)
      First of all, three polyorganosiloxanes POS 1, POS 2 and POS 3 were prepared according to EP 0 157 318 with parameters from Table 1 below.
      POS 4 is a commercially available polyorganosiloxane from Dow Corning.

TABLE 1

| Designation | Chemical name | Alkoxy content [%] | Viscosity [mPas] | Solvent | Solids content [%] |
|---|---|---|---|---|---|
| POS 1 | Phenylmethyl-methoxypolysiloxane | 14.7 | 1760 | — | 95.7 |
| POS 2 | Phenylmethoxypolysiloxane | 17.4 | 4470 | — | 98.4 |
| POS 3 | Phenylmethyl-ethoxypolysiloxane | 15.1 | 450 | MIBK | 90.2 |
| POS 4 | Dow Corning® 3074 | 16.8 | 184 | — | 88.4 |

1.2 Preparation of a hydroxy-functional polyester as component C
      The hydroxy-functional polyesters PES 1-PES 5 were prepared by a process described in DE 37 28 414 C1, by esterification of trimethylolpropane, isophthalic acid and ethylene glycol. The solids content and viscosity were adjusted with the solvents according to Table 2.

TABLE 2

| Polymer solution designation | Solvent | Viscosity [mPas] | Solids content [%] |
|---|---|---|---|
| PES 1 | EtiBu | 5930 | 70.2 |
| PES 2 | DEC | 6270 | 71.5 |
| PES 3 | MPK | 730 | 68.8 |
| PES 4 | MIBK | 860 | 70.4 |
| PES 5 | iBuAc | 4590 | 72.1 |

1.3 Preparation of solvent-based silicone-polyester hybrid solutions (variant 1)

The silicone-polyester hybrid solutions SiPES 6-SiPES 11 were prepared by a process according to EP 0092701.

The silicone-polyester hybrid solution SiPES 12 was prepared by a process according to EP 1072 660.

In this case, components A and C from Tables 1 and 2 were used. Table 3 shows further relevant data.

TABLE 3

| Designation | Polyorganosiloxane | Polyester | Solvent | Silicone content [%] | Viscosity [mPas] | Solids content [%] |
|---|---|---|---|---|---|---|
| SiPES 6 | POS 1 | PES 1 | EtiBu | 30 | 18010 | 69.8 |
| SiPES 7 | POS 2 | PES 2 | DEC | 30 | 4270 | 61.8 |
| SiPES 8 | POS 2 | PES 3 | MPK | 30 | 1983 | 69.8 |
| SiPES 9 | POS 2 | PES 4 | MIBK | 30 | 2490 | 69.1 |
| SiPES 10 | POS 3 | PES 5 | iBuAc | 30 | 29740 | 70.4 |
| SiPES 11 | POS 3 | PES 3 | MPK | 50 | 2370 | 71.3 |
| SiPES 12 | POS 3 | PES 4 | MIBK | 80 | 2150 | 75.9 |

1.4 Preparation of solvent-based silicone-polyester hybrid solutions (variant 2)

The silicone-polyester hybrid solutions SiPES 1-SiPES 5 were prepared by a process according to DE102013218981, Example 1.

In this case, the organic polymers were used as monomers. Table 4 shows relevant data of this silicone-polyester hybrid solution SiPES 1-SiPES 5.

TABLE 4

| Designation | Polyorganosiloxane used | Solvent | Silicone content [%] | Viscosity [mPas] | Solids content [%] |
|---|---|---|---|---|---|
| SiPES 1 | POS 1 | MIBK | 30 | 7220 | 91.2 |
| SiPES 2 | POS 2 | MIBK | 30 | 6400 | 89.8 |
| SiPES 3 | DC 3074 | MIBK | 30 | 6530 | 90.4 |
| SiPES 4 | DC 3074 | EtAc | 30 | 6210 | 89.1 |
| SiPES 5 | DC 3074 | EtAc | 40 | 5740 | 88.4 |

1.5 Solvent-based, epoxy-based polyorganosiloxane hybrid solution (called silicone-polyepoxide hybrid solution for simplification hereinafter)

Commercially available Silikopon® EW from Evonik Industries was used.

2. Preparation of Polyorganosiloxane Hybrid Dispersions

The abovementioned solvent-based silicone-polyester hybrid solutions (variants 1 and 2) and the abovementioned solvent-based silicone-polyepoxide hybrid solution, which are referred to as polyorganosiloxane hybrid resin in the method description below, were used.

2.1 Method 1, Inventive:

80.0 grams of a 16% solution of Pluronic® F 127 in demineralized water and 0.18 gram of 50% sodium hydroxide solution are initially charged in a vessel at room temperature and mixed with a dissolver disc at 500 rpm for 5 minutes. The mixture is adjusted to a conductivity of 1440±50 µS·cm$^{-1}$ with 85% phosphoric acid. Subsequently, 256.0 grams of a polyorganosiloxane hybrid resin dissolved in appropriate amounts of solvent were added. The speed of the stirrer system here is 1000 rpm. The result is a highly viscous paste which, once the addition of the resin had ended, was stirred at 500 rpm for a further 60 minutes. Subsequently, 150.0 grams of demineralized water were added. In the next step, the solvent is removed by distillation. For this purpose, the temperature is raised to 50° C. and the pressure is reduced to 40 mbar. Subsequently, the solids content of the dispersion is determined. The dispersion is subsequently adjusted to 50.0% solid content by addition of demineralized water.

2.2 Method 2, Inventive:

As Method 1, except that the conductivity is adjusted to 1230±50 µS·cm$^{-1}$ with the aid of 50% acetic acid rather than with 85% phosphoric acid.

2.3 Method 3, Inventive:

As Method 2, except that emulsification is accomplished using 68.0 grams of a 20% solution of Synperonic® PE F 108 in demineralized water, 0.10 gram of 25% aqueous ammonia and 12.3 grams of demineralized water, and the conductivity is adjusted to 910±50 µS·cm$^{-1}$ with the aid of 50% acetic acid.

2.4 Method 4, Inventive:

80.0 grams of a 16% solution of Pluronic® PE F 127 in demineralized water, 6.0 grams of Tergitol® 15-S-5 and 2.2 grams of 25% aqueous ammonia are initially charged in a vessel at room temperature and mixed with a dissolver disc at 500 rpm for 5 minutes. Subsequently, 256.0 grams of a polyorganosiloxane hybrid resin dissolved in appropriate amounts of solvent were added. The speed of the stirrer system is 1000 rpm. The result is a highly viscous paste which, once the addition of the resin had ended, was stirred at 500 rpm for a further 60 minutes. Subsequently, 150.0 grams of demineralized water were added. The mixture is adjusted to a conductivity of 1.5±0.1 S·cm$^{-1}$ with 50% acetic acid. In the next step, the solvent is removed by distillation. For this purpose, the temperature is raised to 50° C. and the pressure is reduced to 40 mbar. Subsequently, the solids content of the dispersion is determined. The dispersion is subsequently adjusted to 50.0% solid content by addition of demineralized water.

2.5 Method 5, Noninventive:

According to Example 1 of document DE 44 15 322, 365.0 grams of a solution of a polyorganosiloxane hybrid resin are initially charged in a vessel at room temperature. In addition, 8.1 grams of liquid Tagat® R200, 8.1 grams of TEGO® Alkanol TD 6 and 82.3 grams of demineralized water are added and mixed vigorously at a speed of 2000 rpm for 15 minutes.

2.6 Method 6, Noninventive:

As Method 1, except that, for the emulsifier solution, 12.1 grams of Tergitol® 15-S-15, 8.1 grams of Tergitol® 15-S-7, 0.09 gram of 50% sodium hydroxide solution and 32.8 grams of demineralized water are used.

Particle size, conductivity and residual solvent content were determined for each dispersion E1-E24 prepared. The values can be found in Table 5.

It was found that the comparative dispersions CE5, CE6, CE8, CE10, CE21 and CE23, after the mixing of resin, water and emulsifier, gave a W/O dispersion, and so determination of the particle size and residual solvent content was not possible.

TABLE 5

| Dispersion | Poly-organosiloxane hybrid resin | Method | Diameter [nm] | Emulsifier solution conductivity [μS/cm] | Residual solvent content [% by wt.] |
|---|---|---|---|---|---|
| E1 | SiPES 1 | 1 | 687 | 1430 | 0.55 |
| E2 | SiPES 1 | 2 | 598 | 1220 | 0.76 |
| E3 | SiPES 1 | 3 | 408 | 901 | 0.43 |
| E4 | SiPES 1 | 4 | 601 | 288 | 0.32 |
| CE5 | SiPES 2 | 5 | — | 0 | — |
| CE6 | SiPES 3 | 6 | — | 1412 | — |
| E7 | SiPES 4 | 2 | 398 | 1210 | 0.57 |
| CE8 | SiPES 4 | 5 | — | 0 | — |
| E9 | SiPES 5 | 3 | 507 | 895 | 0.67 |
| CE10 | SiPES 5 | 6 | — | 1452 | — |
| E11 | SiPES 6 | 1 | 423 | 1435 | 0.91 |
| E12 | SiPES 6 | 2 | 511 | 1253 | 0.59 |
| E13 | SiPES 7 | 3 | 393 | 907 | 0.98 |
| E14 | SiPES 7 | 4 | 498 | 295 | 0.48 |
| E15 | SiPES 8 | 3 | 432 | 927 | 0.58 |
| E16 | SiPES 8 | 4 | 456 | 302 | 0.71 |
| E17 | SiPES 9 | 1 | 675 | 1454 | 0.92 |
| E18 | SiPES 9 | 2 | 891 | 1239 | 0.21 |
| E19 | SiPES 9 | 3 | 789 | 888 | 0.30 |
| E20 | SiPES 9 | 4 | 721 | 292 | 0.32 |
| CE21 | SiPES 10 | 5 | — | 0 | — |
| E22 | SiPES 11 | 3 | 734 | 916 | 0.39 |
| CE23 | SiPES 11 | 6 | — | 1441 | — |
| E24 | SiPES 12 | 4 | 906 | 307 | 0.11 |
| E25 | Silikopon EW | 1 | 564 | 1429 | 0.15 |
| E26 | Silikopon EW | 2 | 478 | 1236 | 0.26 |
| E27 | Silikopon EW | 3 | 602 | 899 | 0.23 |
| E28 | Silikopon EW | 4 | 434 | 287 | 0.35 |

It was thus shown unambiguously that the process according to DE 44 15 322 is unsuitable for polyorganosiloxane hybrid resins.

The residual solvent content of the dispersions according to the invention was below 1% by weight.

Performance Measurement

1. Application and Curing Methods 1.1 Method 1: 2-Component Isocyanate Crosslinking Dispersions E1-E9 and E25-E28 were mixed in a ratio of 3:1 with Bavhydur® 3100, and the mixtures were casted onto Q-Panel® aluminium testing panels from Q-Lab with the aid of a spiral bar. Alloy 3003H14; 0.025" thick (0.6 mm); bare mill finish. The wet film thickness is 100 μm. After drying at room temperature for 24 hours, the result is clear, defect-free films with dry film thickness 50 μm. The test panels were aged at 23° C. and 65% relative humidity for 10 days.

1.2 Method 2: Thermal Crosslinking

Dispersions E10-E24 and E25-E28 were casted onto Q-Panel® aluminium testing panels from Q-Lab with the aid of a spiral bar. Alloy 3003H14; 0.025" thick (0.6 mm); bare mill finish. The wet film thickness is 100 μm. After drying at room temperature for 0.5 hour, the result is clear, defect-free films with dry film thickness 50 μm. After this flash-off time at room temperature, the air-dried test panels were baked in an air circulation oven at 250° C. for 15 minutes.

Analogously, the solvent-based SiPES 1, SiPES 2, SiPES 8, SiPES 9 and SiPES 12 were applied and cured.

3. Measurement of Pendulum Hardness

The films were characterized by means of König pendulum hardness (DIN 53 157).

The values can be found in Table 6.

TABLE 6

| Pendulum hardness | | |
|---|---|---|
| Dispersion | Curing method | Pendulum hardness |
| E1 | 1 | 132 |
| E2 | 1 | 122 |
| E3 | 1 | 130 |
| E4 | 1 | 128 |
| E7 | 1 | 122 |
| E9 | 1 | 125 |
| E11 | 2 | 163 |
| E12 | 2 | 161 |
| E13 | 2 | 158 |
| E14 | 2 | 166 |
| E15 | 2 | 162 |
| E16 | 2 | 155 |
| E17 | 2 | 159 |
| E18 | 2 | 163 |
| E19 | 2 | 155 |
| E20 | 2 | 154 |
| E22 | 2 | 161 |
| E24 | 2 | 157 |
| E25 | 1 | 115 |
| E26 | 1 | 125 |
| E27 | 2 | 145 |
| E28 | 2 | 165 |
| Solvent-based comparative examples | | |
| SiPES 1 | 1 | 133 |
| SiPES 2 | 1 | 135 |
| SiPES 8 | 2 | 167 |
| SiPES 9 | 2 | 159 |
| SiPES 12 | 2 | 155 |

It was found that the aqueous dispersions according to the invention have pendulum hardness values that are just as good as the solvent-based dispersions. Pendulum hardness is important because it gives a direct conclusion as to the durability in use of the final coating of the polyorganosiloxane hybrid resin dispersion according to the invention.

The invention claimed is:

1. An aqueous polyorganosiloxane hybrid resin dispersion, comprising:
at least one polyorganosiloxane hybrid resin comprising a reaction product of a composition comprising
component (A): 5 to 95 parts by weight of one or more polyorganosiloxanes of the general formula $$R_a Si(OR')_b O_{(4-a-b/2)} \qquad \text{Formula (I)}$$

with 0<a<2, 0<b<2 and a+b<4,
optionally, component (B): 0-20 parts by weight of one or more linear polyorganosiloxanes of the formula $$R''O-[R'''_2 Si-O]_n-R'' \qquad \text{Formula (II), and}$$

component (C): 5 to 95 parts by weight of an organic polymer which is a polyester,
wherein
$R_a$, $R'$, $R''$ and $R'''$ are each independently an alkyl radical having 1 to 8 carbon atoms or an aromatic radical having 6 to 20 carbon atoms and n is a number in the range from 4 to 250,
at least one amphiphilic emulsifier, wherein the emulsifier has an HLB value of 9 to 19 and is a triblock copolymer having a middle block of polypropylene oxide and two terminal blocks of polyethylene oxide or mixtures thereof, and
water.

2. The polyorganosiloxane hybrid resin dispersion according to claim 1, wherein the organic polymer comprises a hydroxyl group and/or acidic hydrogen.

3. The polyorganosiloxane hybrid resin dispersion according to claim 1, wherein a residual solvent content is <5.0% by weight, based on the polysiloxane hybrid resin dispersion.

4. The polyorganosiloxane hybrid resin dispersion according to claim 1, further comprising an additive selected from the group consisting of defoamers, deaerating agents, rheology additives, preservatives, substrate wetting agents, crosslinkers, drying aids, catalysts, antioxidants, anti-skinning agents, anti-settling agents, thickeners, coalescing agents, film-forming aids, fillers, pigments, dispersants and mixtures thereof.

5. The polyorganosiloxane hybrid resin dispersion according to claim 4, wherein the preservatives used are fungicides, bactericides, pesticides, algicides and/or herbicides.

6. The polyorganosiloxane hybrid resin dispersion according to claim 1, wherein an average volume-weighted diameter of the polyorganosiloxane hybrid resin particles, measured according to ISO 13320:2009 is between 0.1-10.0 µm.

7. The polyorganosiloxane hybrid resin dispersion according to claim 1, which has a solids content of 30% by weight-70% by weight, based on the dispersion.

8. A process for preparing aqueous polyorganosiloxane hybrid resin dispersion according to claim 1, comprising:
emulsifying a polyorganosiloxane hybrid resin solution comprising an organic solvent with at least one emulsifier or an emulsifier system,
adding water, and
removing the solvent.

9. A process for preparing aqueous polyorganosiloxane hybrid resin dispersion according to claim 8, wherein an aqueous emulsifier solution or an aqueous emulsifier system solution is used, wherein the conductivity thereof, measured to DIN 53779, is between 10-25 000 µS cm$^{-1}$.

10. A process for preparing aqueous polyorganosiloxane hybrid resin dispersion according to claim 9, wherein the conductivity of the aqueous emulsifier solution or the aqueous emulsifier system solution is adjusted.

11. A process according to claim 8, wherein the organic solvent or mixture thereof has a boiling point range of 50° C.-150° C.

12. A process according to claim 8, wherein the polyorganosiloxane hybrid resin solution has a polyorganosiloxane hybrid resin concentration of 40.0% by weight-95.0% by weight, based on the polyorganosiloxane hybrid resin solution.

13. Coating materials, coatings, paints, substrate coatings, semifinished products, adhesives, inks, sealants, compounding matrices or sizes, comprising:
the polyorganosiloxane hybrid resin dispersion according to claim 1.

14. A substrate coated with a composition comprising a dispersion according to claim 1.

* * * * *